(No Model.) 4 Sheets—Sheet 1.

J. SCHREIBER.
Spring Motor for Sewing Machines.

No. 236,635. Patented Jan. 11, 1881.

Witnesses:
R. F. Barnes
Warren Seely

Inventor:
Josef Schreiber
by Alex Spear
Attorney (No Model.) 4 Sheets—Sheet 2.
J. SCHREIBER.
Spring Motor for Sewing Machines.
No. 236,635. Patented Jan. 11, 1881.
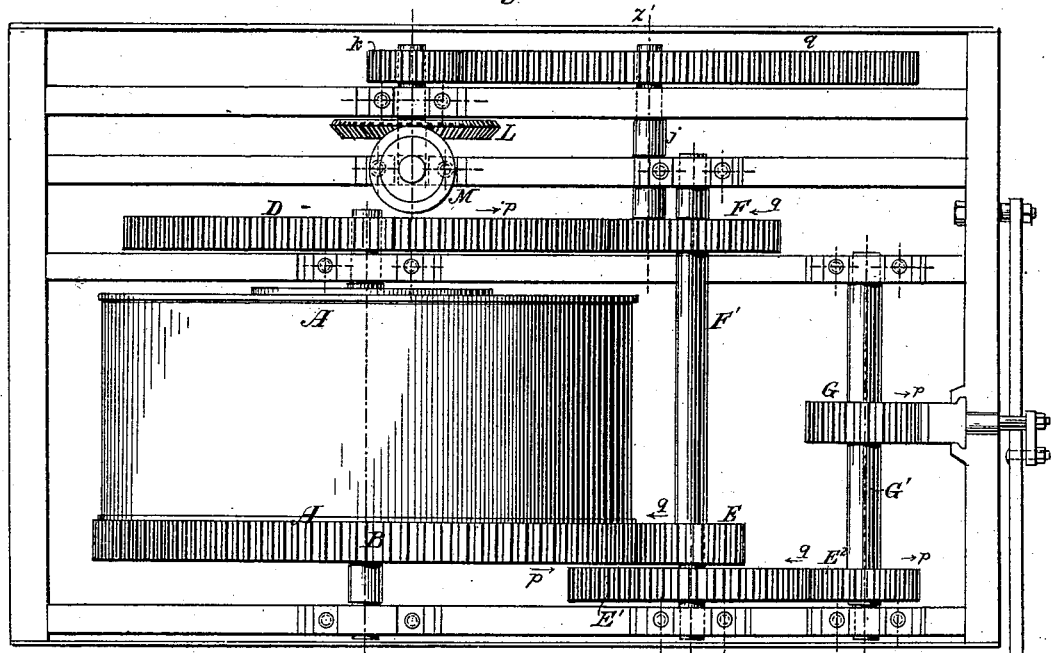
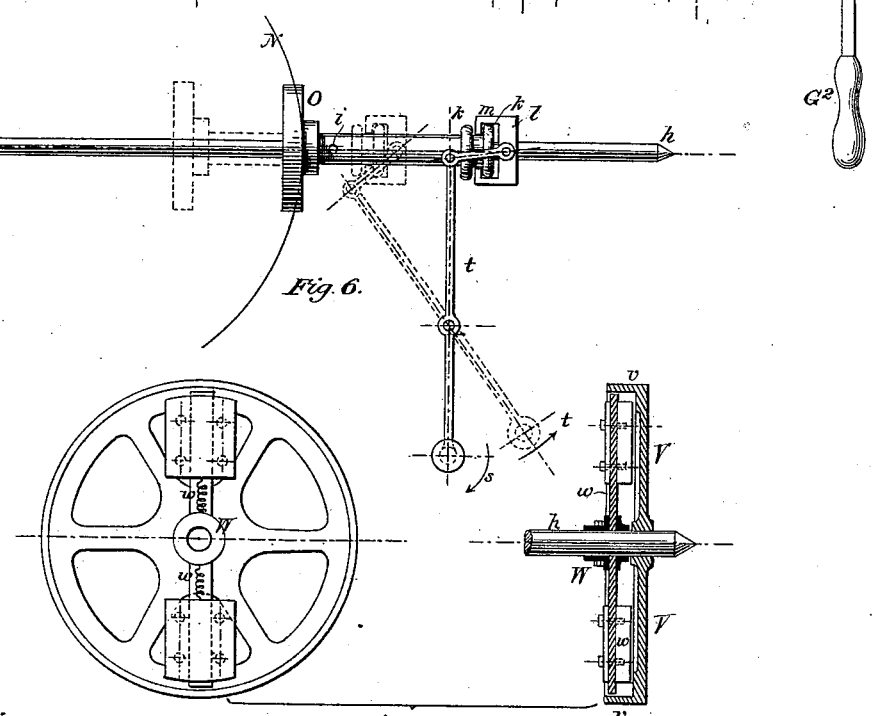
Witnesses:
R. F. Barnes.
Warren Seely
Inventor:
Josef Schreiber
by Alex Spear
Attorney (No Model.) 4 Sheets—Sheet 3.
J. SCHREIBER.
Spring Motor for Sewing Machines.
No. 236,635. Patented Jan. 11, 1881.

Witnesses:
R. W. Barnes.
Warren Seely.

Inventor:
Josef Schreiber
by Alis Spear
Attorney

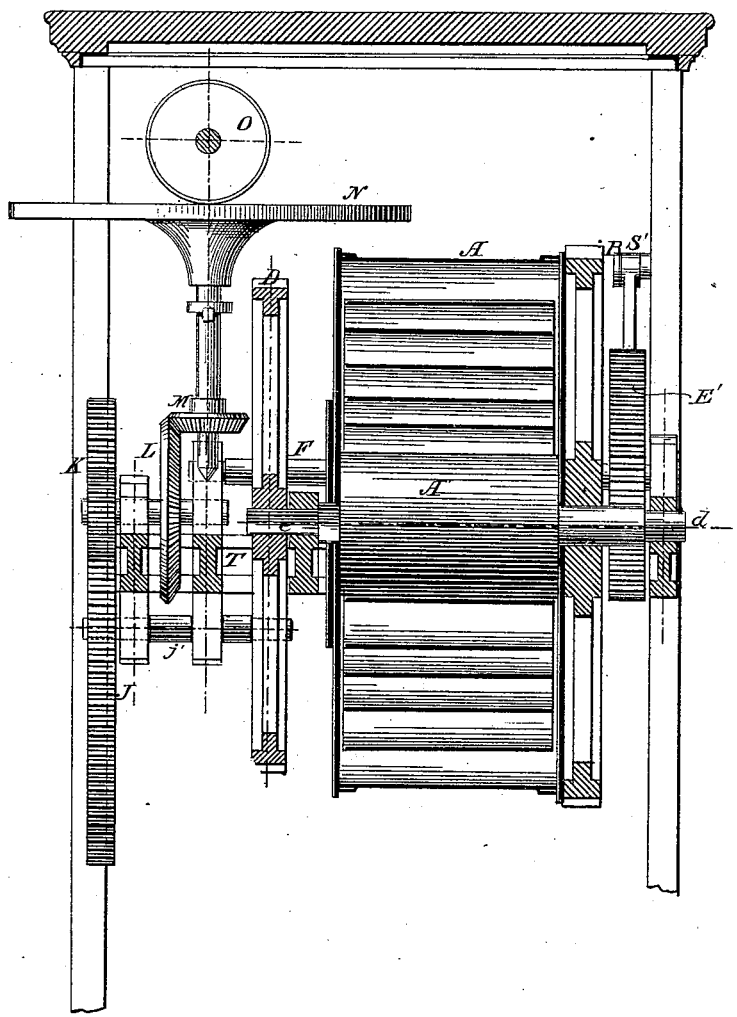

UNITED STATES PATENT OFFICE.

JOSEF SCHREIBER, OF VIENNA, AUSTRIA, ASSIGNOR OF ONE-HALF TO FRANZ HEINRICH MOLDENHAUER, OF SAME PLACE.

SPRING-MOTOR FOR SEWING-MACHINES.

SPECIFICATION forming part of Letters Patent No. 236,635, dated January 11, 1881.

Application filed November 8, 1880. (No model.)

*To all whom it may concern:*

Be it known that I, JOSEF SCHREIBER, of the city of Vienna, in the Austrian Empire, have invented certain new and useful Improvements in Spring-Motors, of which the following is a specification.

This invention relates to improvements in spring-motors, whereby the superfluous power of the wound-up spring is applied for partially rewinding up the spring and to attain an equable distribution of the power applied. The spring is wound up by the superfluous power of the coiled spring until the amount of power of the spring employed for driving an apparatus, machine, &c., and the power required for winding up the spring are equal. It is obvious that the duration of the operation of the spring is considerably increased. The regaining of power at the same time as power is being applied is attained in the manner described below.

Figures 1, 4, 5:
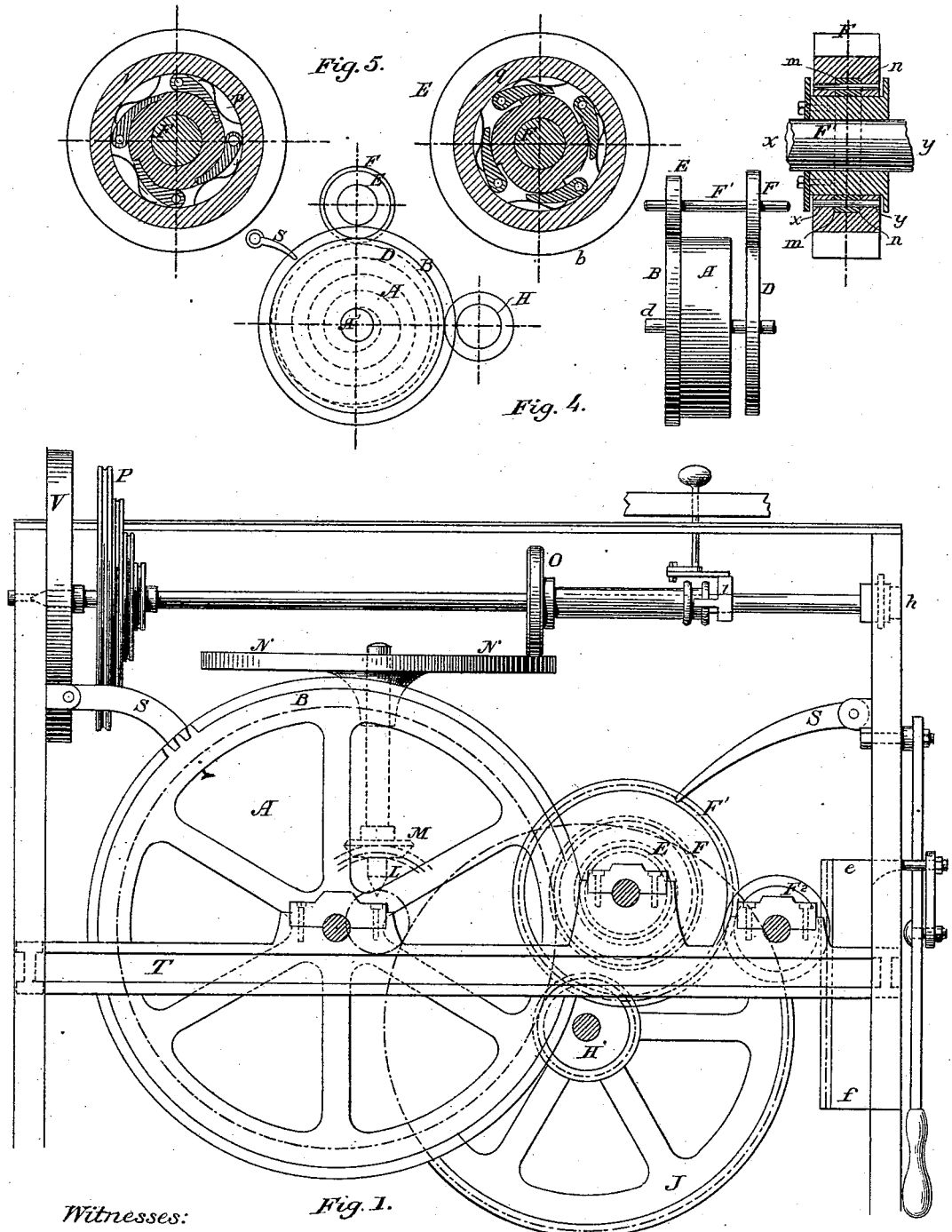
Figure 3:
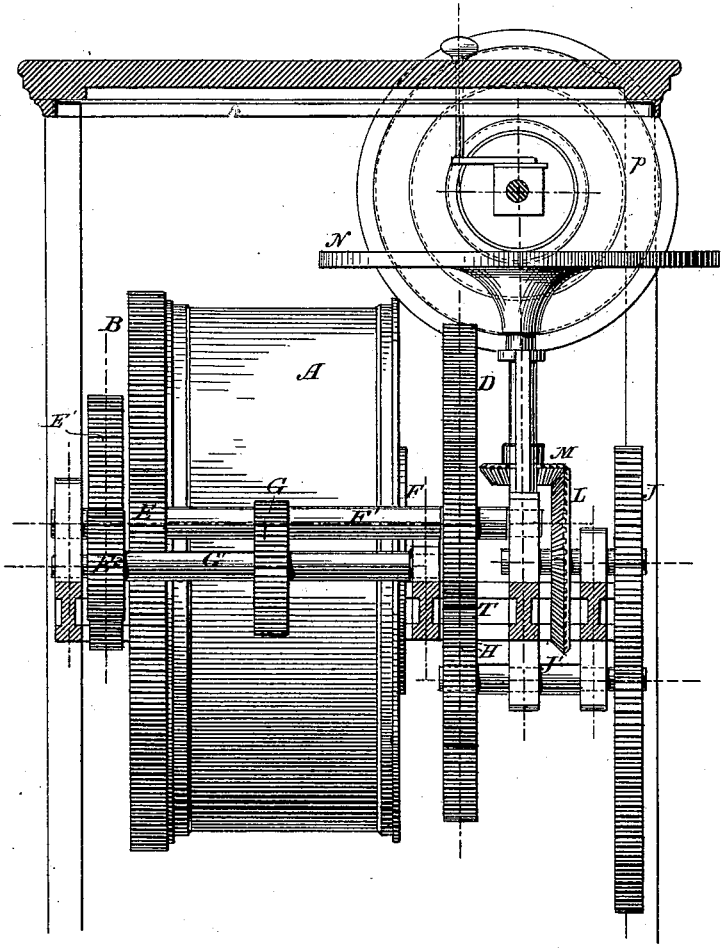

Figure 1 is a front elevation of a motor constructed according to my invention. Fig. 2 is a plan or top view of the motor with the table-top and the friction-wheels removed. Fig. 3 is a side view with the side wall to the table removed. Fig. 3$^a$ is a section on the line $e\,f$ in Figs. 1 and 2. Fig. 4 is a front and side view of the case, box, or cylinder for the spring and the wheels in connection with the same. Fig. 5 is a section of the wheel E with ratchet arrangement. Fig. 6 represents the arrangement for moving the friction-wheel O. Fig. 7 is a side view and section of the brake-regulator.

A, Figs. 1 to 4, is the box, case, or cylinder which contains the spring, and to which one end of the spring is attached. B is the toothed wheel attached to the said spring box, case, or cylinder A. A' is the shaft or axle on which the spring box or case A and the wheels B and D are attached. The wheel F gears into the wheel D and is keyed to the shaft F'. The wheels E and E' are keyed to the opposite end of the shaft F'. The wheel E gears into the wheel B and the wheel E' into the wheel E$^2$ on the shaft G'. A pinion, G, is keyed or otherwise attached to the said shaft G', and is operated through the rack $e\,f$, or in other suitable manner, by means of the lever G$^2$. The pinion H, which is attached to the same shaft with the wheel I, gears into the wheel D. The pinion K gears into the wheel I and drives the conical wheels L M, the friction-wheels N O, and the step-drum P. A pair of pawls, S S', gear into the wheels E' and B, to act as brakes on the machine when the same is not in use for driving or operating a sewing-machine or other apparatus, and to prevent the said wheels from making a retrograde movement when the spring is being wound up.

Instead of the pawls, another suitable brake arrangement can be employed.

The spring for driving the motor is so arranged in the cylindrical box or case A that the one end is connected to the shaft or spindle A' and the other end to the wall or side of the spring box or case A. The spring box or case A sits loosely on the spindle A', to which one end of the spring is attached, and is so provided with a toothed wheel, B, that both spring-case A and wheel B revolve around a mutual axis. A second wheel, D, of smaller diameter than the wheel B, attached to the spring-case A, is keyed to the shaft A'. These said wheels B and D gear so into two wheels keyed to a common shaft, F', that a certain portion of the power given out by the spring is employed to wind the spring up again. The spring can be coiled or wound up by a crank attached direct to the axle of the spring, or, in connection with the same, by means of intermediate wheels; or the lever shown in the accompanying drawings can be employed for this purpose.

To avoid friction in the mechanism for winding up the spring the last wheel E of the gearing is so provided with a ratchet-wheel and pawls, Fig. 5, that the said ratchet arrangement revolves in the same direction with the wheel E without coming into operation, but will not permit of a retrograde movement of the said last wheel E. The wheel E, which gears into the wheel B, attached to the spring box or case A, is provided with the ratchet arrangement above mentioned, so that the said wheel E comes into operation during the action of the motor, but remains stationary during the winding up of the spring, as the spring box, case, or cylinder A is held stationary during this said winding or coiling up of the spring.

The ratchet movement, Fig. 5, is formed as follows: In the interior of the wheel E, which is to be provided with the same, one or more pawls with springs are arranged, which gear into the teeth of a muff which forms the hub of the wheel and is attached to the shaft of the said wheel E; or the axle or spindle A', to which the spring is attached, can be held stationary and the spring wound up by revolving the spring box, case, or cylinder A. In this latter case the wheel F, which gears into the wheel D, keyed to the spring axle or shaft A', must be provided with the brake or ratchet arrangement shown in the wheel E, Fig. 5.

For changing the velocity of the motor two friction-wheels, N O, are so arranged that the one wheel revolves in a horizontal, the other in a vertical, direction. The vertical wheel O can be moved backward and forward on its horizontal shaft.

To be able to vary the velocity of the machine driven by the motor the wheel O is attached to a muff, in a slot of which a pin, $i$, moves, which causes the revolution of the wheel, Fig. 6. The muff can be moved by means of the lever $t$ and the fork $m$, or a foot-lever; or a pair of conical or step drums can be employed for varying the speed of the said motor.

For regulating the speed of the motor in case the machine which it drives is suddenly stopped, I employ the brake-regulator, Fig. 7. Two brake-blocks adjusted by springs to the normal velocity are pressed firmly against the walls $v$ of the case or mantle V, so that the velocity is decreased.

Having now described my said invention and the manner of carrying the same into effect, what I claim, and desire to secure by Letters Patent, is—

1. A box or case adapted to rotate loosely on a shaft, A', and containing a spring, in combination with a wheel, D, keyed to said shaft A', and with means for communicating the motion of such case to said wheel D, whereby the spring is wound up.

2. In a spring-motor, the combination of the box or case A, containing the spring, the wheel B, secured to said case A and revolving loosely therewith on a shaft, A', a wheel, D, keyed to said shaft, and gear-wheels E F, whereby the rotary motion of the wheel B is communicated to the wheel D, substantially as and for the purpose set forth.

3. The described brake mechanism, consisting of the brake-blocks having the springs, in combination with a revolving disk.

4. The described speed-regulator, consisting of the friction-wheels N, sliding wheel O, and pin $i$.

JOSEF SCHREIBER.

Witnesses:
MAX LOIVEMUHL,
KARL LIPSCHUTZ.